(12) United States Patent
Feytons (10) Patent No.: US 9,531,717 B2
(45) Date of Patent: Dec. 27, 2016

(54) METHOD OF SECURING ACCESS TO DATA OR SERVICES THAT ARE ACCESSIBLE VIA A DEVICE IMPLEMENTING THE METHOD AND CORRESPONDING DEVICE

(75) Inventor: Dirk Feytons, Edegem (BE)

(73) Assignee: Thomson Licensing, Issy-les-Moulineaux (FR)

( * ) Notice: Subject to any disclaimer, the term of this patent is extended or adjusted under 35 U.S.C. 154(b) by 226 days.

(21) Appl. No.: 13/635,187

(22) PCT Filed: Mar. 21, 2011

(86) PCT No.: PCT/EP2011/054270
§ 371 (c)(1),
(2), (4) Date: Nov. 29, 2012

(87) PCT Pub. No.: WO2011/117205
PCT Pub. Date: Sep. 29, 2011

(65) Prior Publication Data
US 2013/0198825 A1   Aug. 1, 2013

(30) Foreign Application Priority Data
Mar. 22, 2010  (EP) .................................. 10447009

(51) Int. Cl.
*G06F 7/04* (2006.01)
*G06F 15/16* (2006.01)
*G06F 17/30* (2006.01)
*H04L 29/06* (2006.01)
*H04L 29/08* (2006.01)

(52) U.S. Cl.
CPC ........... *H04L 63/10* (2013.01); *H04L 63/0876* (2013.01); *H04L 63/1466* (2013.01); *H04L 67/142* (2013.01); *H04L 67/146* (2013.01); *H04L 63/0254* (2013.01); *H04L 63/101* (2013.01)

(58) Field of Classification Search
CPC .... H04L 63/10; H04L 63/0876; H04L 63/101; H04L 67/142; H04L 67/146
USPC .................................. 726/5–6, 10; 709/228
See application file for complete search history.

(56) References Cited

U.S. PATENT DOCUMENTS

| 6,073,178 | A | 6/2000 | Wong et al. |
| 6,141,758 | A | 10/2000 | Benantar et al. |
| 7,127,496 | B2* | 10/2006 | Isozu et al. ................... 709/228 |
| 7,143,438 | B1* | 11/2006 | Coss et al. ..................... 726/11 |
| 7,174,018 | B1 | 2/2007 | Patil et al. |

(Continued)

FOREIGN PATENT DOCUMENTS

| CA | 2 422 268 A1 | 2/2000 |
| EP | 0909074 | 4/1999 |

(Continued)

OTHER PUBLICATIONS

Search Rept:Aug. 3, 2011.

*Primary Examiner* — Christopher Revak
*Assistant Examiner* — Vadim Savenkov
(74) *Attorney, Agent, or Firm* — Myers Wolin LLC (57) ABSTRACT

The invention allows to secure access to data or services that are available for devices and applications via a device implementing the method. In order to secure the access to data or to one or more services that is/are accessed via a network device, the invention proposes a method that among others avoids unauthorized access to a data or one or more services and a device implementing the method.

18 Claims, 4 Drawing Sheets

(56) References Cited

U.S. PATENT DOCUMENTS

| | | |
|---|---|---|
| 8,346,951 B2 * | 1/2013 | Hayes .......................... 709/229 |
| 2005/0015601 A1 | 1/2005 | Tabi |
| 2005/0076369 A1 * | 4/2005 | Cai .................... H04L 12/185 |
| | | 725/62 |
| 2005/0083961 A1 * | 4/2005 | Pecen ...................... H04J 3/26 |
| | | 370/432 |
| 2005/0132222 A1 | 6/2005 | Petrovic |
| 2005/0162424 A1 | 7/2005 | Imai et al. |
| 2006/0077988 A1 * | 4/2006 | Cheng et al. ................. 370/401 |
| 2006/0171379 A1 | 8/2006 | Watanabe et al. |
| 2007/0162968 A1 * | 7/2007 | Ferreira et al. ................ 726/12 |
| 2007/0256122 A1 | 11/2007 | Foo et al. |
| 2007/0274525 A1 * | 11/2007 | Takata et al. ................ 380/270 |
| 2008/0098228 A1 | 4/2008 | Anderson et al. |
| 2009/0055912 A1 | 2/2009 | Choi et al. |
| 2009/0151006 A1 * | 6/2009 | Saeki et al. ...................... 726/28 |
| 2011/0035784 A1 * | 2/2011 | Jakobsson ........................ 726/2 |

FOREIGN PATENT DOCUMENTS

| | | |
|---|---|---|
| GB | 2367986 A | 4/2002 |
| JP | 2002278935 | 9/2002 |
| JP | 2004534996 | 11/2004 |
| JP | 2005086428 | 3/2005 |
| JP | 2005202573 | 7/2005 |
| JP | 2005318121 | 11/2005 |
| JP | 2006501558 | 1/2006 |
| JP | 2006072990 | 3/2006 |
| JP | 2006099694 | 4/2006 |
| JP | 2006119769 | 5/2006 |
| JP | 2006217096 | 8/2006 |
| JP | 2007065981 | 3/2007 |
| JP | 2008046875 | 2/2008 |
| WO | WO02091706 | 11/2002 |
| WO | WO2004031986 | 4/2004 |
| WO | WO2004071015 | 8/2004 |

* cited by examiner

METHOD OF SECURING ACCESS TO DATA OR SERVICES THAT ARE ACCESSIBLE VIA A DEVICE IMPLEMENTING THE METHOD AND CORRESPONDING DEVICE

This application claims the benefit, under 35 U.S.C. §365 of International Application PCT/EP2011/054270, filed 21 Mar. 2011, which was published in accordance with PCT Article 21(2) on 29 Sep. 2011 in English and which claims the benefit of European patent application No. EP10447009.1, filed 22 Mar. 2010.

1. FIELD OF INVENTION

The present invention generally relates to digital data communications, and more particularly, to a method and an apparatus for securing access to data and services to devices connected in a network.

2. TECHNICAL BACKGROUND

Local networks are most often organized around a central device, called gateway. The gateway is then the mandatory passage for communications between the local network or LAN (Local Area Network) and devices in the external network or WAN (Wide Area Network). Current developments show that gateways, especially in a home network environment, play an ever increasing centralized role. With the widespread deployment of gateways and the number of network-connected devices in the home network, gateways are becoming interesting targets for hackers. Home networks typically comprise one or more of the following devices interconnected to the gateway via USB (Universal Serial Bus), Ethernet or WiFi connectivity: Personal Computers (PCs), wireless telephone sets, IPTV (Internet Television) Set Top Boxes (IPTV STBs), DLNA (Digital Living Network Alliance) television sets, and mass-storage devices. To protect the home network devices from attacks, the gateway's security measures are most often reduced to the presence of individual antivirus and/or firewall functions on the PCs. The security of the home network further profits from a Network Address Translation (NAT) feature in the gateway, a feature that allows to distribute network addresses to devices in the home network, which addresses are unknown outside the home network. The use of a NAT feature results in hiding the individual addresses of the devices in the local network to devices on the external network. Thus, this means that only a limited protection is provided for the gateway itself and for the other connected devices not being equipped with antivirus and/or firewall software. Among others, the access to the gateway for home network administration purposes is done via a web-based application running on a web-browser application in the gateway, and it is well-known that web servers are vulnerable to security flaws. Vulnerability in the web-browser can then give a hacker access to not secured devices connected in the home network, and can give a hacker even access to all communication between devices of the home network and the external network, because all the communication between the home network and the external network and vice versa passes through the gateway.

Users that want to configure their gateway, for example to change or enter a security key for wireless access, e.g. WPA (Wi-Fi Protected Access), or configure NAT port mappings, or to configure local file sharing between the devices connected to the gateway usually have to log in on a web application of the gateway. Such a web application is accessible via for example HTTP of HTTPS protocol, one of the protocols of the Internet Protocol Suite, that is situated in the Application Layer (the Internet Protocol comprises a Link-, an Internet-, a Transport- and an Application Layer; examples of link layer protocols are ARP, DSL; examples of Internet layer protocols are IP, IGMP; examples of transport layer protocols are TCP, UDP; examples of application layer protocols are HTTP/HTTP as mentioned, but also DHCP, RTP, SOAP, SSH). Once successfully authenticated they will be assigned a session that is identified by a session identifier or session-ID. All requests that use the session identifier will then considered as 'safe' and be processed by the web server on the gateway, whereby the access rights are limited to the rights associated with the user. A malicious hacker will thus try to get hold of such a session-ID, e.g. by spying on communications between the gateway and the devices connected to it, or by getting access to information stored by the web browser and extract any stored session IDs, and then use the obtained session IDs to get access to devices, data and/or services. This technique is known as session-stealing.

Various mechanisms are put in place to prevent session-stealing. For example, session-IDs are randomly generated to make them unpredictable, web-browsers refuse access to cookies in which session-IDs are stored from code running in the context of another web-site than the web-site that obtained the session-ID, session-IDs are deleted after an idle time-out. Nevertheless, there always remains a possibility of a valid session-ID being stolen. In such a case it would be useful to have an additional protection mechanism that limits the usefulness of the session ID.

A well-known protection mechanism is to lock the session to an IP address of the origin of the first request. In practice, this causes session loss for example for users that access the web server via proxy server farms, load balancers, or NATs. For such users, their IP address can legitimately change between several requests.

There is thus a need for better way of securing the network devices from malicious attacks that target to get control of a gateway or of one or more devices connected to the gateway, that does not have the drawbacks of prior art.

3. SUMMARY OF THE INVENTION

The present invention aims at alleviating some inconveniences of prior art.

More precisely, the invention allows securing access to data or to one or more services ("data/service" or "data/services" hereinafter) that are accessible for devices and applications via a device implementing the method, such as a gateway device.

In order to secure the access to data and or to one or more services, the invention proposes Method of securing access to data and services that are accessed via a network device implementing the method, the method comprising a step of reception of a request for accessing data or at least one service, the request comprising a source identifier identifying a source of the request; a step of determination if the request is a first request or a subsequent request, the determination comprising a verification of a presence in the request of a session identifier identifying a session for accessing the data or the service when the request is a subsequent request; a step of, if the request is a first request, determination of a source identifier group for the source identifier, and if the source identifier group can be determined, generating a session identifier to be used for subsequently accessing data or at least one service from sources having source identifiers that are within the determined source identifier group, processing of the first request, and transmission of the generated session identifier to the source of the first request; and a step of, if the request is a subsequent request, determination of a source identifier group for the source identifier, and if the source identifier group can be determined, comparing the session identifier comprised in the subsequent request with the session identifier to be used for accessing data or at least one service from sources having source identifiers that are within the determined source identifier group, and processing of the subsequent request if the source identifiers correspond.

According to a variant embodiment of the invention, the information identifying a source of the request identifies a source of transmission of the request.

According to a variant embodiment of the invention, the information identifying a source of the request identifies a source of reception of the request.

According to a variant embodiment of the invention, the information identifying a source of the request designates a number of a physical connector.

According to a variant embodiment of the invention, the information identifying a source of the request designates a number of a network interface.

According to a variant embodiment of the invention, the information identifying a source of the request designates a network interface address.

According to a variant embodiment of the invention, the information identifying a source of the request designates an identifier of a software application.

According to a variant embodiment of the invention, the method is active on an application layer of an Internet Protocol suite.

According to a variant embodiment of the invention, the method is implemented in a web application.

The invention also comprises a network device for securing access to data and services that are accessed via the device, the device comprising a network interface for receiving of a request for accessing data or at least one service, the request comprising a source identifier identifying a source of the request, and an optional session identifier identifying a session for accessing the data or the service; means for determination if the request is a first request or a subsequent request, the determination comprising a verification of a presence in the request of a session identifier identifying a session for accessing the data or the service when the request is a subsequent request; if the request is a first request, means for determination of a source identifier group for the source identifier, and if the source identifier group can be determined, for generating a session identifier to be used for accessing data or at least one service from sources having source identifiers that are within the determined source identifier group, for processing of the first request, and the network interface for transmission of the generated session identifier to the source of the first request; if the request is a subsequent request, means for determination of a source identifier group for the source identifier, and if the source identifier group can be determined, for comparing the session identifier with the session identifier to be used for accessing data or at least one service from sources having source identifiers that are within the determined source identifier group, and for processing of the subsequent request if the source identifiers correspond.

4. LIST OF FIGURES

More advantages of the invention will appear through the description of particular, non-restricting embodiments of the invention. The embodiments will be described with reference to the following figures.

5. DETAILED DESCRIPTION OF THE INVENTION

Figure 1:
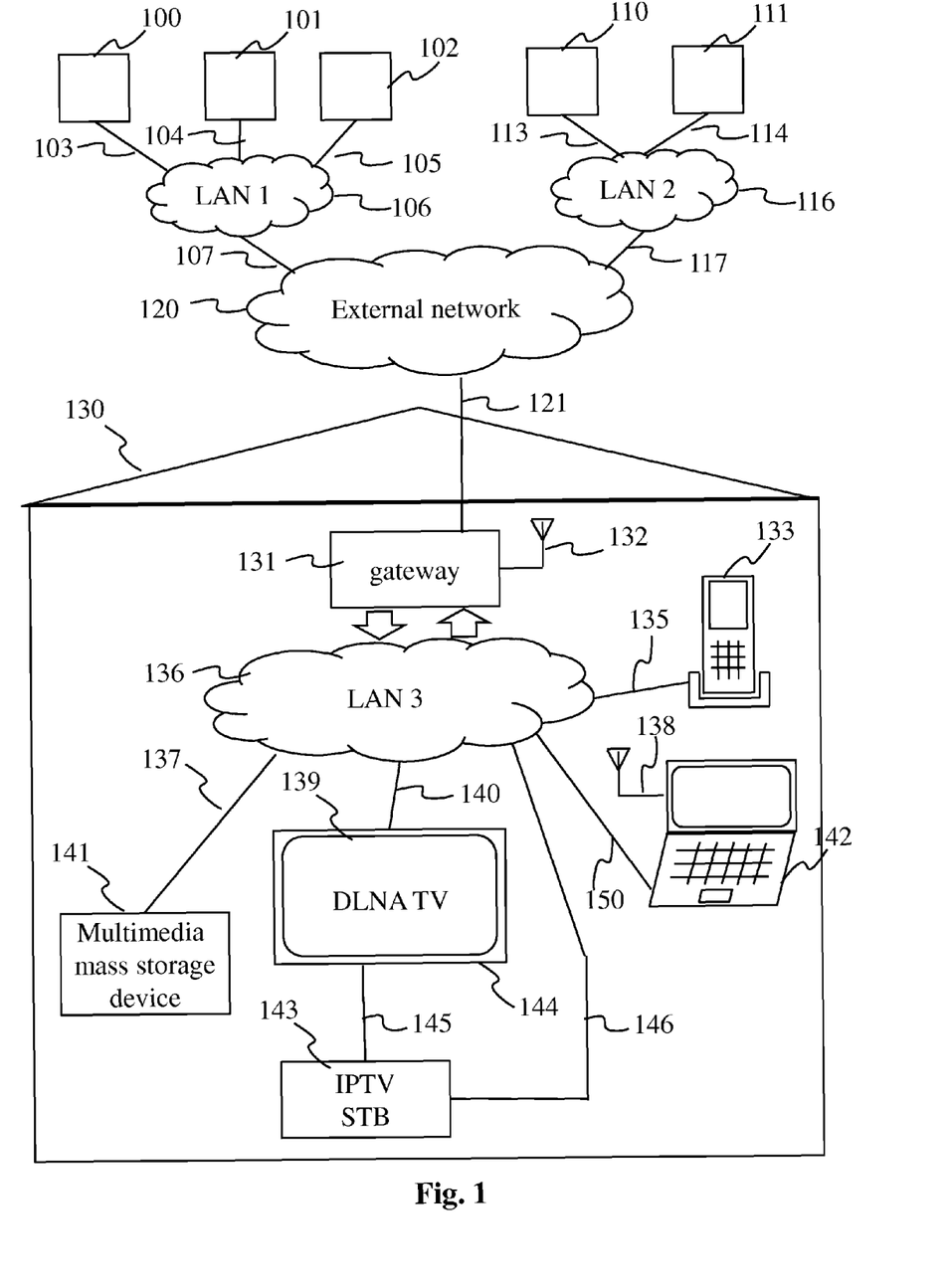
FIG. 1 shows a particular embodiment of the invention, illustrated by means of network-interconnected devices.

FIG. 1 shows a particular embodiment of the invention in a gateway device that interconnects different networks.

A user premise 130 comprises a gateway 131, and a local area network 136 interconnecting the gateway 131 with a multimedia storage device 141, a DLNA television set 139, an IPTV Set Top Box 143, a portable PC 142 and a telephone set 133. Devices 133, 139, 141 and 143 are connected to the local network 136 via wired connections respectively 135, 140, 137 and 146, whereas the portable PC 142 is connected to the gateway via a wireless connection over 132 and 138.

The gateway 131 is further connected to an external network 120 via connection 121. To the external network 120 are connected two local networks 106 and 116. Three devices 100, 101 and 102 are connected to local network 106 whereas two devices 110 and 111 are connected to local network 116. All of these devices 100-102, 110-111, 131, 133, 139, 141-143 are possible sources of requests to access data or services.

Figure 2:
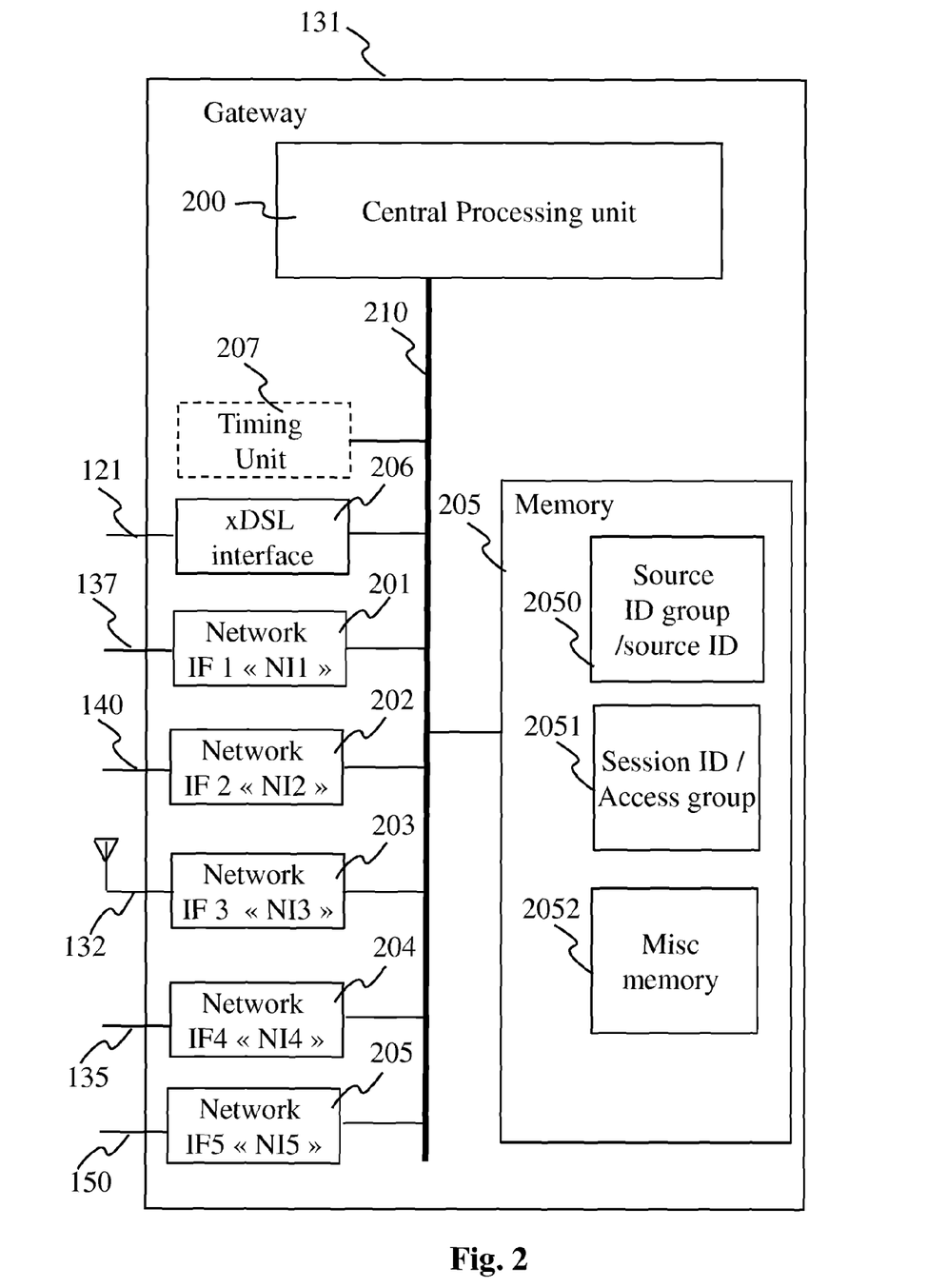
FIG. 2 shows gateway 131 of FIG. 1, according to a particular embodiment of the invention.

FIG. 2 shows a gateway 131 of FIG. 1, according to a particular embodiment of the invention.

The gateway 131 comprises the following elements:
a central processing unit 200 or CPU;
a DSL (Digital Subscriber Line) interface 206;
four network interfaces 201-202 and 204-205 of type Ethernet;
a fifth network interface 203 of a Wireless-LAN type;
a memory 205, comprising a source identifier group/source ID repository 2050, a session ID/source identifier group repository 2051 and a multipurpose memory zone 2052; and
an optional timing unit 207.

CPU 200, network interfaces 201-205, memory 205, DSL interface 206 and timing unit 207 are interconnected through a digital data communication bus 210. Device 131 has the following input/outputs: input/output 137 is connected to network interface 201, input/output 140 is connected to network interface 202, antenna 132 is connected to network interface 203, input/output 135 is connected to network interface 204, input/output 150 is connected to network interface 205, and input/output 121 is connected to DSL interface 206.

Inside memory 205, storage region 2050 serves for storing and retrieving the source identifier group—source ID relationship, and storage region 2051 for storing and retrieving the session-ID—source identifier group relationship. This information is stored for example in table form such as previously described tables 1 and 2. According to a variant embodiment, this information is stored in a database.

Optional timing unit 207 serves for adding time-out delays to session-IDs and can be used in various ways to further increase session-ID security. For example, if a generated session-ID is not being used for a certain time, e.g. there has been no request for data/service during a certain amount of time, the session ID is automatically revoked. Any new request using a revoked session ID is then refused. For example, a session ID is automatically revoked after a certain time-out delay, indifferently whether the session-ID is used or not.

Central processing unit 200 is capable of processing an algorithm that implements the steps of the invention. The algorithm is stored in multipurpose memory zone 2052. Multipurpose memory 2052 further serves to store variables needed for the execution of the algorithm.

The processing unit 200 is capable of determining and storing in memory 205 of a first identifier (session-identifier) to be used for one or more requests. The processing unit 200 is further capable of processing a request for accessing data or for accessing a service. The processing unit 200 is further capable of determining from information stored in memory 205 of a source identifier group for a session identifier. The processing unit 200 is further capable of processing a request for accessing data or a service if previous determination shows that there exists at least one source identifier group for the session identifier and if it is determined that the source identifier as provided in the request is comprised in the at least one source identifier group for the session identifier.

Session IDs can be generated according to known methods, such as based on random number generation.

Figure 3:
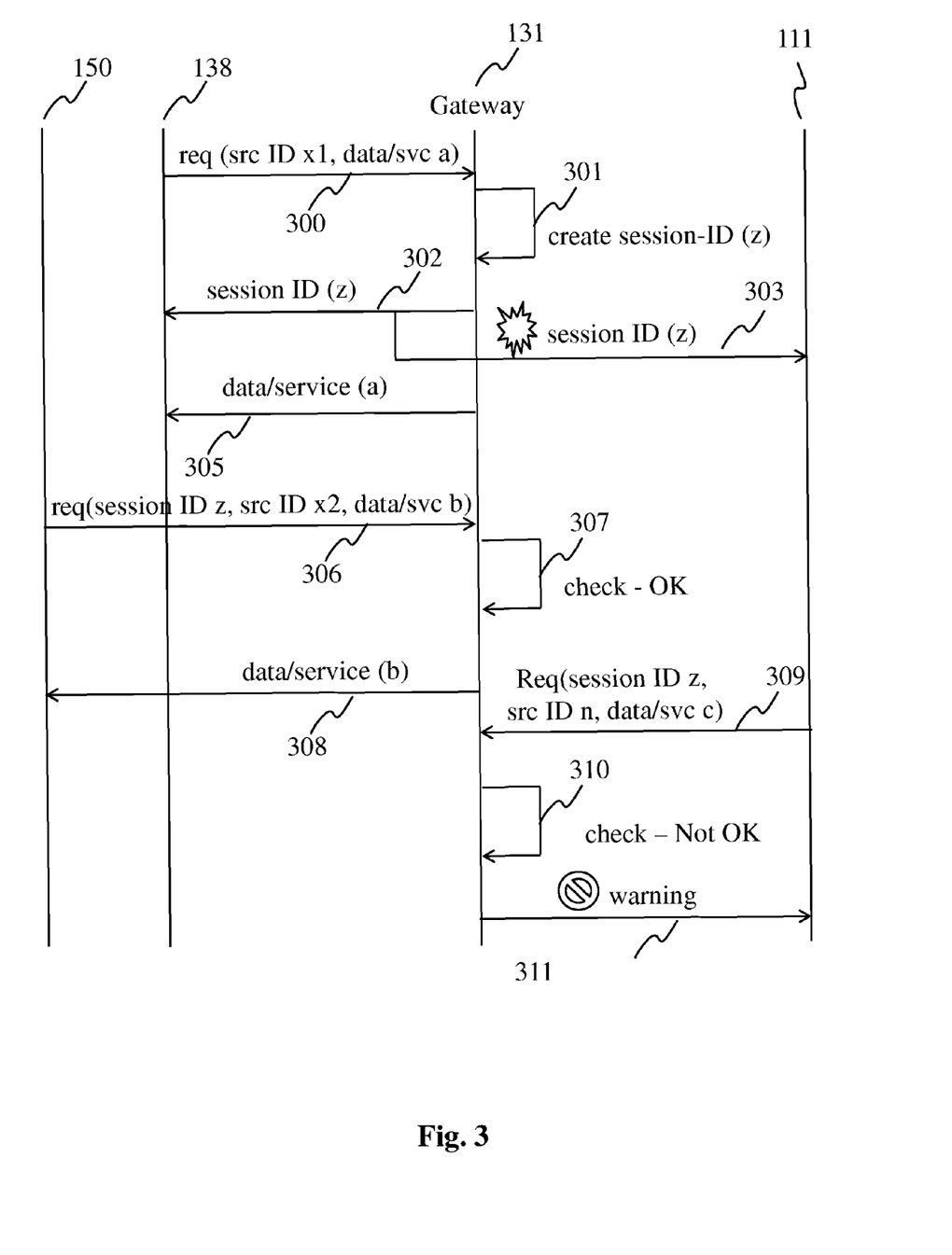
FIG. 3 shows a sequence diagram illustrating the sequence of events upon reception of a request for data/service, according to a particular embodiment of the invention.

FIG. 3 shows a sequence diagram illustrating the sequence of events upon reception of a request for data/service, according to a particular embodiment of the invention.

The figure illustrates some of the aspects of the invention, and shows in particular the protocol of exchanges in a simple scenario between a device in local network, a gateway implementing the invention and a device in an external network according to a particular embodiment of the invention.

The sequence diagram is illustrated by means of four vertical timelines representing two connections to different network interfaces of PC 142, gateway 131 and a device 111 that is present in LAN2 116.

The sequence diagram starts by the sending by PC 142 over connection 132/138 from network interface "NI3" of a request 300 for data/service "a" to gateway 131. "NI3" represents information that allows to identify the source from which the request 300 originates. According to a particular embodiment of the invention, this source ID is the IP address of the network interface of the source from which the request is sent, i.e. in this case of interface 3 of gateway 131, and the source ID thus identifies the source of reception of the request. According to a variant embodiment of the invention, the source ID is the IP address of network interface 138 of PC 142, and the source ID thus identifies the source of transmission of the request. According to a variant embodiment of the invention, the source ID designates a particular physical connector on a network interface board from which the request is transmitted or from which the request is received. According to yet another variant, the source ID is any combination of the preceding, for example a combination of the IP address of the network interface of the source from which the request is transmitted, and the IP address of the network interface on which the request is received. This variant has the advantage to add further security to access to data/service, by a tight coupling between the request and the network link which is used for transmitting the request, which is useful in cases where restrictive access is needed. The individual variants have the advantage to allow a looser coupling which may be necessary in situations where more mobility is allowed.

According to a variant embodiment of the invention, this source ID is an application identifier, in this case of the application running on device PC 142 that is the origin of the request. As an example, the application is a VPN (Virtual Private Network) application, providing secure access to a company network via tunneling. Upon reception of the request 300, the gateway 131 generates a session identifier "z", illustrated by arrow 301. Such session ID is only generated upon reception of a first request for data/service of a series of subsequent requests. According to a particular embodiment of the invention, determination whether a first or subsequent request is received is done based on checking in the information stored in the memory of gateway 131 whether a session ID was already generated for the source ID. If no session ID is present for the source ID, the request is a first request, otherwise the request is a subsequent request. According to a variant embodiment of the invention, determination whether a first or subsequent request is received is based on the presence of a session ID in the request; if the request does not comprise a session-ID, it is a first request, otherwise it is a subsequent request. This variant has the advantage to be simple to implement, but compared to the particular embodiment described above, has the disadvantage to allow easier generation of session IDs, which a hacker could use to obtain information on the type of IDs generated, and to determine what valid session IDs look like. With the described particular embodiment, it is more difficult for a hacker to obtain new session-IDs, because he can only get a new session ID the first time he requests data or service from a same source (ID). In the illustrated example, arrow 301 shows that the request received is a first request, upon which a session-ID is generated. According to a particular embodiment of the invention, this session-ID is then stored and communicated to the requester, illustrated by arrow 302. According to a variant embodiment of the invention, the session ID is, rather than communicated directly to the requester, included in the response 305 to the request 300 that comprises information on the requested data/service. The requester (here PC 142) stores the session ID and uses it for subsequent requests until the session ID is revoked. The gateway 131 determines one or more source identifier groups for the source ID, based on information stored in memory zone 2050. According to a particular embodiment of the invention, the source identifier group/source ID information in memory zone 2050 is manually entered by a user, e.g. a network administrator. According to a variant embodiment of the invention, the source identifier group/source ID information in memory zone 2050 is automatically generated, e.g. based on network topology information that is known by the gateway 131, or based on information on applications that are known by the gateway 131. According to yet another variant embodiment of the invention, the source identifier group/source ID information in memory zone 2050 is partly automatically generated, partly manually entered by a user. The latter variant is particularly interesting, allowing relieving the user of the task of manually entering the bulk of data, while allowing him to modify or adapt the automatically generated information.

Upon generation of the new session ID, gateway 131 relates the session ID (here: z) to a source identifier group (for example LAN3) valid for the source ID (here: "NI3")

and stores this information (i.e. the generated session ID and its relation to a source identifier group) into memory zone 2051.

At a given moment, the scenario illustrated in FIG. 3 shows an intrusion 303 by a malicious hacker into the local network 136, giving the hacker access to session IDs generated by gateway 131. Next, PC 142 issues on a different network interface ("NI5") than that which was used for the first request 300 ("NI3") a subsequent request 306 for data/service (b). The subsequent request 306 comprises information on the requested data/service (b), information of the source identification that is the origin of the request ("NI5"), and the session ID (here: z) that it received from gateway 131 for subsequent requests. Upon reception of the subsequent request 306, the gateway 131 determines (307), by means of information stored in memory zone 2050 (source id group/source ids, see table 1), the source identifier group to which the source ID belongs (LAN3). According to a particular embodiment of the invention, if no source identifier group is found for the source ID (310), the gateway 131 sends a warning message (311) to the source that issued the request. According to a variant embodiment, the gateway 131 puts the source ID of the requester on a blacklist, which is checked every time when a request for data/service is received. If the source ID is on the blacklist, the request can then be refused without further processing. According to yet another variant embodiment, the session ID is considered to be compromised and is revoked, upon which a new session ID must be requested. Different combinations of these embodiments are possible and increase the session security. If however a source identifier group is found (307), gateway 131 determines by means of information stored in memory zone 2051 (session id/source id group, see table 2) if the session ID (z) provided by the request 306 is valid for one of the source identifier groups that were found (LAN3). If no valid source identifier group is found, the same functioning as described above can be applied according to different variant embodiments of the invention, i.e. warning message, blacklist, or both. According to the illustrated example, the verifications are OK and the data/service (b) is rendered to the requesting device 142, which is illustrated by arrow 308. When however the hacker tries to use the stolen session ID (z) by sending of a request 309 for data/service (c) that comprises the stolen session ID (z), the step of determination of the source identifier group for the session identifier (z), followed by a determination if the source ID (n) is in the determined source identifier group (LAN3), will show (310) that the source ID (n) is not in any source identifier group for the session ID (z), and thus the request is refused, and misuse of the session ID is thus avoided.

According to a particular embodiment, at least the information in the memory zones 2050 and 2051 is encrypted, thereby avoiding that a hacker obtains information on how session-IDs are related to source identifier groups and what valid IP addresses exist for these source identifier groups, which information a hacker could use to get access to data/services by address spoofing.

The figure illustrates an intrusion coming from outside of the local network. Of course, an intrusion can also come from the inside of the network, e.g. a hacker may have got access to the local network via a wireless or wired connection to the gateway 131.

The data/service to which access is requested is accessed via the gateway. This means that the gateway may directly provide the data/service, or that the gateway is a mere intermediate device, the data/service being provided by another source connected via the gateway.

According to the invention, as illustrated by the discussed figure, an allowable subsequent request is not necessarily originating from the same source, as the source that issued the first request. The invention allows great flexibility with regard to this point, thus allowing for example change of source ID between requests, as long as the source ID of the request belongs to one of the source identifier group(s) that are defined for the session ID that is used.

The gateway stores a relation between source identifier groups and source IDs, and between session-IDs and source identifier groups. If, according to the stored information, one or more source identifier groups are determined to exist for a session-ID comprised in a request, it is verified if the source ID belongs to a source identifier group of the source ID to which the session-ID was attributed. If so, the access to the requested data/service is granted; if not, the access to the requested data/service is refused. For the gateway this is an opportunity to take additional security measures, like putting the source ID on a blacklist, revoking of the session ID, alerting the network administrator.

According to a particular embodiment an implementation of such a mechanism uses tables stored in the gateway device. An example of such an implementation is given hereunder.

TABLE 1

Source identifier group - Source ID relationship

| Source identifier group | Source ID |
|---|---|
| LAN1 | 191.211.100.1-10 |
| LAN2 | 191.211.100.11-20 |
| WAN | 211.203.196.100-255 |
| local | 127.0.0.1 |
| tunnel | SecureVPN |
| DMZ | 100.205.191.1-5 |
| guest | 192.110.180.1-255 |

TABLE 2

Session ID - Source identifier group relationship

| Session-ID | Source identifier group |
|---|---|
| 34567123 | DMZ |
| 565675 | local |
| 28901 | local |
| 787544 | guest |
| 8743214457 | LAN 1 |
| 8445865 | LAN 2 |

The above table 1 shows how source identifier groups are related to different source IDs, according to the network interface identifier or use. For each source identifier group, one or more valid source IDs are defined. Devices that are part of LAN1 for example have source IDs that range from IP address 191.211.100.1-10. Devices in LAN2 have source IDs that correspond to IP addresses from 191.211.100.11 to 191.211.100.20. Devices in the Wide-area network WAN are devices, for example on the Internet, for which source IDs are defined that range from IP addresses 211.203.196.100-255. Local represents the gateway itself. Tunnel represents VPN (Virtual Private Network) interfaces; to this is a source ID defined that is an identifier of the VPN tunneling application. This is an example of a source ID that is an identifier of an application, rather than a network interface address. DMZ (for DeMilitarized Zone) represents source IDs of devices that are located in a protected part of the network. Guest represents devices that are connected to the network on a temporary base. Previously it has been explained how information in this table is entered (automatically, manually, or a combination of these).

The above table 2 shows how session-IDs are related to source identifier groups. For each session-ID, the source identifier group to which the session ID is associated is stored.

According to a particular embodiment, the source IDs that are used in the first and the subsequent requests identifies a source of reception of these requests. This way, it is possible to define source identifier groups according to a source of reception, for example: WAN (coming from outside of the local network), or local (coming from the home gateway). According to a variant embodiment, the source IDs that are used in the first and the subsequent requests identifies source of transmission of these requests. For example: an IP address that falls into the subnet of IP addresses used by an ISP (Internet Service Provider). According to yet another variant embodiment, the source IDs identifies both the source of transmission and the source of reception, for example the source IDs are represented by an IP address that falls into the subnet of IP addresses used by an ISP to transmit the request (=source of transmission) and the name of the IP interface (=source of reception) plus the port number on which the request will be received (=source of reception). This can be advantageous, because with this variant, a session ID can for example be restricted to requests coming from an ISP from the WAN side and transmitted to interface with name "Internet" on the gateway, port 443 (HTTPS, meaning Secured HTTP).

According to a variant embodiment of the invention, the source IDs identify a number of a physical connector, for example connector 1, connector 8. This allows to associate a session to a physical connector, and securing access to data/services that is requested with a stolen session ID, but which request is transmitted or received or both according to the variant of embodiment, from a different physical connector number.

According to yet another variant embodiment of the invention, the source IDs identify a network interface address. Since a network interface can possibly have several network interface addresses, coupling a source ID to a network interface address thus allows to binding of a session ID to a specific subnet. This variant embodiment is less strict than the previous described embodiment.

According to yet another variant embodiment of the invention, the source IDs identify a number of a network interface. This variant has the advantage to propose a way of securing access to data/services that is less strict than the previous described embodiment, and is suited for example to couple a session ID to a network interface having several logical connectors.

According to yet another variant embodiment of the invention, the source IDs identify an identifier of a software application. This allows to relate source IDs to software applications, which allows in turn to secure access to data/service accessible via a device that implements the method of the invention, for a roaming application that is allowed to run on different devices.

According to a variant embodiment, two or more of the preceding variants are combined, which allows a particular precise way of securing access to data/service. For example, a source ID is defined from a network interface address on which the request is received (=the source of reception of the request) and the connector number on which the request is received, the port number of the destination and the connector number on which the request is received. When both wired and wireless connections are bridged underneath this (logical) network interface this allows to make sure that a session ID is usable only by devices on that network and cannot migrate between different connectors unless HTTPS is being used. This ensures secrecy of the session ID as much as possible, irrespective of whether encryption (WEP, WPA) is being used on the wireless connection. WEP, for Wired Equivalent Privacy is an algorithm to secure IEEE 802.11 wireless networks. Wi-Fi Protected Access (WPA and WPA2) is a certification program developed by the Wi-Fi Alliance to indicate compliance with the security protocol created by the Wi-Fi Alliance to secure wireless computer networks.

Figure 4:
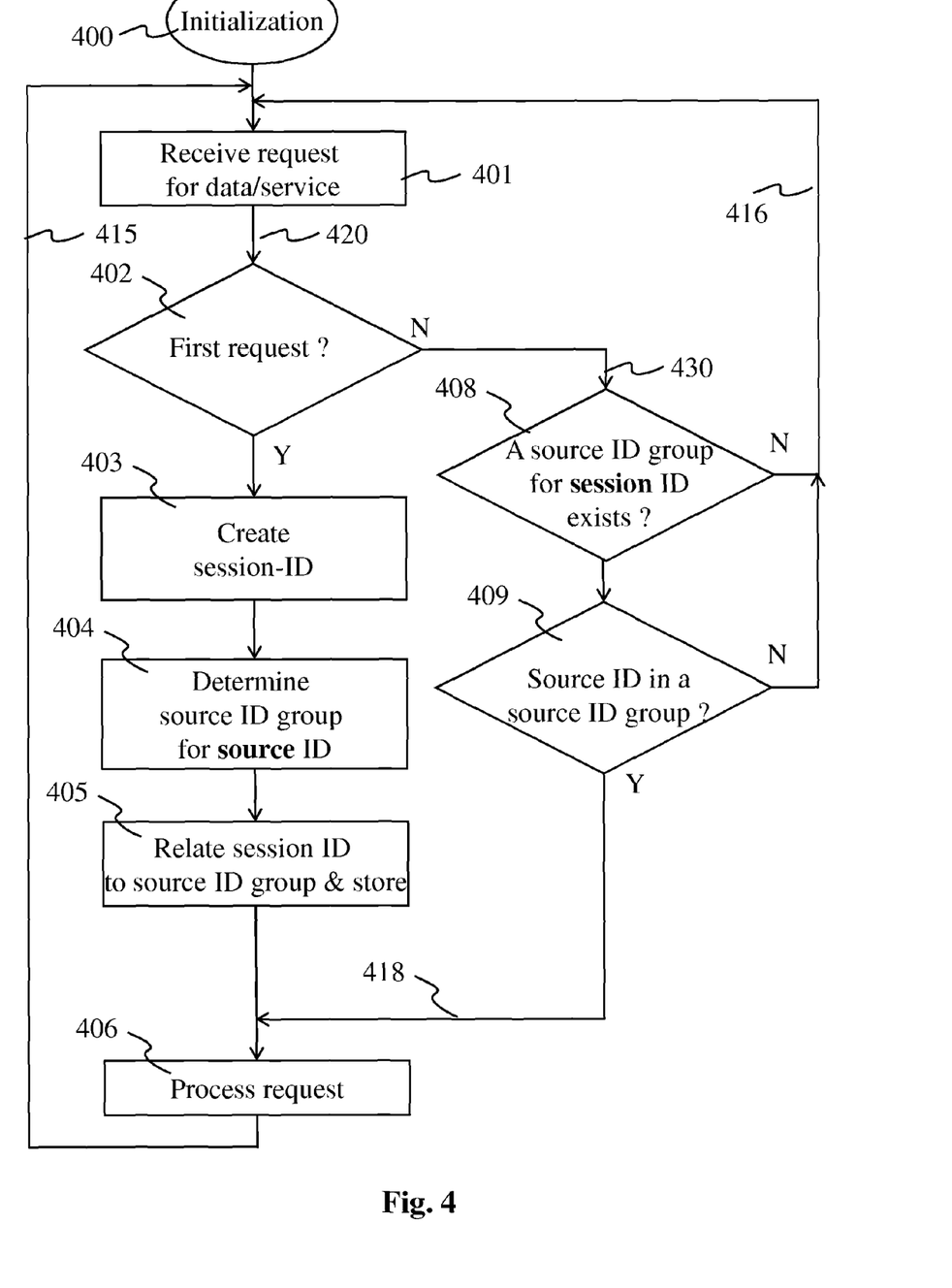
FIG. 4 shows an algorithm implementing a particular embodiment of the method of the invention, implemented for example by the gateway of FIG. 1.

FIG. 4 shows an algorithm implementing a particular embodiment of the method of the invention, implemented for example by gateway 131 of FIG. 1.

The algorithm starts with a step 400 of allocation and initialization of variables needed for its execution. Then, in a step 401 a request for data/service is received, such as request 300 of FIG. 3. Upon reception of the request, a test step 402 is executed.

If it is determined that this is a first request (see the description of FIG. 3 for how this can be determined) the algorithm continues with step 403, where a session ID is created. See the description of FIG. 3 for how, according to different variant embodiments of the invention, the session ID is generated, stored and communicated to the requester. Then, according to a step 404, a source identifier group is determined for the source ID based on information stored in the gateway's memory zone 2050. Next, in a step 405, the generated session ID is associated to the source identifier group that was determined in previous step 404 and the session ID and its relation to the source identifier group is stored in memory zone 2051 of gateway 131. As a last step, the request is processed, i.e. the requested data/service is transferred/rendered, and the algorithm reiterates with step 401 of awaiting a request for data/service. If such a request is received and it is determined that it is not a first request, step 408 is executed, in which it is determined if there exists at least one source identifier group in gateway 131's memory zone 2050 that comprises the session ID provided by the requester. If no such source identifier group exists, the request is refused and the algorithm reiterates with step 401 of awaiting a request. That no source identifier group exists for the session ID, means that the session ID is not valid, e.g. it is a non-existing session-ID or a revoked session-ID, i.e. the session identifier does not correspond to (i.e. is the same as) a session ID associated to any source identifier group. Step 408 thus allows to reject the request on this basis, and step 408 thus constitutes an additional security measure in securing access to data/service. See for the description of FIG. 3 of how the different variant embodiments of the invention handle a rejection of a request. If however such a source identifier group exists, the source ID of the request is compared in a step 409 to the source ID of the found source identifier group(s), by verifying with the information in memory zone 2051 of gateway 131. If no same source ID exists, the request is refused and the algorithm reiterates with step 401 awaiting a reception of another request. See for the description of FIG. 3 of how the different variant embodiments of the invention handle a rejection of a request. If however such a same source ID exists in any of the source identifier groups that are valid for the session ID, i.e. where valid means that the session ID from the request corresponds to (i.e. is the same as) a session ID associated to at least one of the above discussed any of the source identifier groups, the request is allowed and further processed in step 406.

This way, the origin of any request with a valid session ID is verified, so that requests that originate from a source identifier group that is not one of the source identifier groups of the request upon which the session ID was created, are refused.

In order to comply to the invention it is not necessary to execute the steps as depicted in FIG. 4 in the described order. For example, step 408 can be executed before step 409 without changing the result. In the same way, step 403 can be executed after step 404.

According to a particular embodiment of the invention, the method is active on the OSI (Open Systems Interconnection) reference model application layer of the Internet Protocol suite, i.e. it is applied to the OSI reference model application layer. This has the advantage, that the method then is complementary to protections that are active on lower layers of the OSI reference model, such as a firewall. The method then adds additional security to existing protection methods.

According to a particular embodiment of the invention, the invention is implemented in a web application, thereby offering an advantage of directly in a centralized manner protecting the access to data and/or services there where it is most needed, i.e. there where the access portal is.

The network described in FIG. 1 is a mere example network in which the invention can be used. Other network configurations are possible while remaining compatible with the invention, comprising for example more than one user premise, with each one or more local networks. The architecture of the local network, in FIG. 1, may also be composed differently, according to the number of devices, the type of devices used, and/or the applications used. Likewise, the interfaces that are illustrated of device 131 are DSL and Ethernet interfaces, but the invention is not limited to the use of DSL and Ethernet. Gateway 131 implementing the invention is illustrated in FIG. 1 as being a distinct device from other devices, however implementation of the invention is not limited to a gateway or a stand-alone device, the invention may very well be implemented on any device in a network for example on personal computer 142. According to another variant embodiment of the invention, the invention is implemented on a proxy device being the access point for all communications between the local network and other networks.

Other types of intermediate devices than gateway 131 illustrated by FIG. 2 are possible while being compatible with the invention, such as device with multiple dedicated processing units, multiple digital data communication buses. According to a variant embodiment of the invention, the physical connections of the device 131 are regrouped in one or more network interfaces, i.e. instead of having one interface for each connection, a network interface has multiple connections. Then, a particular network interface can be used to define a particular subnetwork, and the source IDs can then be related to the particular network interface. The invention may be completely built from software components running on a general-purpose device such as a Personal Computer, and the invention can then be implemented using a mix of hard- and software components. According to a particular embodiment, the invention is entirely implemented in hardware, for example as a dedicated component (for example as an ASIC, FPGA or VLSI) (respectively <<Application Specific Integrated Circuit>>, <<Field-Programmable Gate Array>> and <<Very Large Scale Integration>>) or as distinct electronic components integrated in a device or in a form of a mix of hardware and software.

The invention claimed is:

1. A method of securing access to data and services that are accessed via a network device implementing the method, said method being implemented by said network device, wherein the method comprises:

receiving a request for accessing data or at least one service, the request comprising a source identifier identifying a source of the request;

if the request does not comprise a session identifier, and if a stored source identifier group exists in memory for the source identifier, generating a session identifier for subsequently accessing data or at least one service from sources having source identifiers that are in the source identifier group existing in memory for the source identifier, storing in memory information associating said generated session identifier with said stored source identifier group for the source identifier, granting the request, and transmission of the generated session identifier to the source of the request; and if the request comprises a session identifier, and if a stored source identifier group exists in memory for the session identifier comprised in the request, comparing source identifiers associated with the source identifier group existing in memory for the session identifier comprised in the request to said source identifier comprised in said request, and granting the request if the source identifier comprised in said request is comprised in said source identifiers associated with the stored source identifier group for the session identifier comprised in the request.

2. The method according to claim 1, wherein the source identifier comprised in the request identifies a source of transmission of the request.

3. The method according to claim 1, wherein the source identifier comprised in the request identifies a source of reception of the request.

4. The method according to claim 1, wherein the source identifier comprised in the request designates a number of a physical connector.

5. The method according to claim 1, wherein the source identifier comprised in the request designates a number of a network interface.

6. The method according to claim 1, wherein the source identifier comprised in the request designates a network interface address.

7. The method according to claim 1, wherein the source identifier comprised in the request designates an identifier of a software application.

8. The method according to claim 1, wherein the method is active on an application layer of an Internet Protocol suite.

9. The method according to claim 8, wherein the method is implemented in a web application.

10. A network device for securing access to data and services that are accessed via the device, wherein the device comprises:

a network interface configured to receive a request for accessing data or at least one service, the request comprising a source identifier identifying a source of the request;

if the request does not comprise a session identifier, and if a stored source identifier group exists in memory for the source identifier, a processor configured to generate a session identifier for subsequently accessing data or at least one service from sources having source identifiers that are in the source identifier group existing in memory for the source identifier, said processor being further configured to store in memory information associating said generated session identifier with said stored source identifier group for the source identifier, and said processor being further configured to grant the request, and the network interface being further configured to transmit the generated session identifier to the source of a first request; and if the request comprises a session identifier, and if a stored source identifier group exists in memory for the session identifier comprised in the request, said processor being configured to compare source identifiers associated with the source identifier group existing in memory for the session identifier comprised in the request to said source identifier comprised in said request, and processor being configured to grant the request if the source identifier comprised in said request is comprised in said source identifiers associated with the stored source identifier group for the session identifier comprised in the request.

11. The network device according to claim 10, wherein the source identifier comprised in the request identifies a source of transmission of the request.

12. The network device according to claim 10, wherein the source identifier comprised in the request identifies a source of reception of the request.

13. The network device according to claim 10, wherein the source identifier comprised in the request designates a number of a physical connector.

14. The network device according to claim 10, wherein the source identifier comprised in the request designates a number of a network interface.

15. The network device according to claim 10, wherein the source identifier comprised in the request designates a network interface address.

16. The network device according to claim 10, wherein the source identifier comprised in the request designates an identifier of a software application.

17. The network device according to claim 10, wherein the processor is configured to execute operations in accordance with an application layer of an Internet Protocol suite.

18. The network device according to claim 10, wherein the processor is configured to implement a web application.

* * * * *